United States Patent
Wang et al.

(10) Patent No.: US 9,139,471 B2
(45) Date of Patent: Sep. 22, 2015

(54) METHOD FOR MANUFACTURING FOAM MATERIAL USING MOLTEN SLAG

(75) Inventors: Qingtao Wang, Shandong (CN); Xianjin Yu, Shandong (CN); Xin Zhao, Shandong (CN); Benkui Gong, Shandong (CN); Zhenxia Wei, Shandong (CN); Yueyun Li, Shandong (CN); Jun Ming, Shandong (CN)

(73) Assignee: SHANDONG COKING GROUP CO., LTD., Shandong (CN)

( * ) Notice: Subject to any disclaimer, the term of this patent is extended or adjusted under 35 U.S.C. 154(b) by 409 days.

(21) Appl. No.: 13/820,567

(22) PCT Filed: Sep. 20, 2011

(86) PCT No.: PCT/CN2011/079896
§ 371 (c)(1),
(2), (4) Date: Mar. 4, 2013

(87) PCT Pub. No.: WO2012/041174
PCT Pub. Date: Apr. 5, 2012

(65) Prior Publication Data
US 2013/0161854 A1    Jun. 27, 2013

(30) Foreign Application Priority Data
Sep. 27, 2010 (CN) .......................... 2010 1 0293064

(51) Int. Cl.
*B29C 44/00* (2006.01)
*C04B 5/06* (2006.01)
*C04B 111/00* (2006.01)
*C04B 111/52* (2006.01)

(52) U.S. Cl.
CPC .................. *C04B 5/065* (2013.01); *B29C 44/00* (2013.01); *C04B 5/06* (2013.01); *C04B 2111/00793* (2013.01); *C04B 2111/52* (2013.01)

(58) Field of Classification Search
CPC ...... B29C 44/00; B29C 44/3446; C04B 5/06; C04B 5/065; B09B 3/00
USPC .................................. 264/42, DIG. 25; 65/20
See application file for complete search history.

(56) References Cited

U.S. PATENT DOCUMENTS 8,673,047 B2 * 3/2014 Reichel et al. ............... 75/10.46

FOREIGN PATENT DOCUMENTS

| CN | 1065646 | 10/1992 |
|---|---|---|
| CN | 1923741 | 3/2007 |
| CN | 101020968 | 8/2007 |
| CN | 101121948 | 2/2008 |
| CN | 101259987 | 9/2008 |
| CN | 101289332 | 10/2008 |
| CN | 101318787 | 12/2008 |
| CN | 101323503 | 12/2008 |
| CN | 101372405 | 2/2009 |
| CN | 101559953 | 10/2009 |
| CN | 101698568 | 4/2010 |
| CN | 101805128 | 8/2010 |

OTHER PUBLICATIONS

International Search Report for PCT/CN2011/079896, English translation attached to original, Both completed by the Chinese Patent Office on Dec. 5, 2011, All together 8 Pages.

* cited by examiner

*Primary Examiner* — Joseph S Del Sole
*Assistant Examiner* — Lawrence D Hohenbrink, Jr.
(74) *Attorney, Agent, or Firm* — Brooks Kushman P.C.

(57) ABSTRACT

A method for manufacturing a foam material by using a molten slag includes: introducing the molten slag maintained at 1400° C.-1500° C. into a pool for preserving heat, and adding a viscosity modifier and/or a color modifier to the molten slag to adjust a viscosity and/or a color a product manufactured. The molten slag is discharged into a foaming pour while adding a foaming agent to the molten slag, while controlling the foam and mold at 1250° C.-1400° C. The foamed and molded slag is maintained at 800° C.-1000° C. for 20-30 minutes in a non-reducing atmosphere, and then naturally cooled to a room temperature to obtain the foam material. The produced inorganic nonmetal foam material and products thereof have such characteristics as stable color quality, abrasion resistance, pressure resistance, small thermal conductivity, small shrinkage ratio, and excellent sound absorption, adsorption and filtering performances.

13 Claims, No Drawings

US 9,139,471 B2

METHOD FOR MANUFACTURING FOAM MATERIAL USING MOLTEN SLAG

CROSS-REFERENCE TO RELATED APPLICATION

This application is the U.S. national phase of PCT Appln. No. PCT/CN2011/079896 filed on Sep. 20, 2011, which claims priority to CN Patent Application No. 201010293064.7 filed on Sep. 27, 2010, the disclosures of which are incorporated in their entirety by reference herein.

FIELD OF INVENTION

The present invention relates to the technical filed of inorganic nonmetal material, more particularly, to a method for directly manufacturing a foam material by using a molten slag.

DESCRIPTION OF RELATED ART

The ferrous metallurgy industry has produced a huge amount of waste slag which may be hardly brought to multi-purpose utilization. The existing waste slag has already become a major culprit for environment pollution and a factor that limits the development of the metallurgy industry. The disposal of the waste slag generally used in current industry is as follows: discharging a slag from a furnace at 1400-1600° C.; cooling down the slag by using water (referred to as "water quench" in practice); picking up and drying the slag; and making the dried slag into powders to be used to manufacture cement. However, the above process can only deal with a part of waste slag, moreover, said process may produce waste water and waste gas, and what's worse, a large amount of sensible heat contained in the blast furnace slag is wasted and may bring further pollution to the environment.

Since the current production and research on the use of blast furnace slag are based on the waste slag processed by water quench, the consumption of fresh water to cool down the waste slag cannot be reduced, and the heat energy contained in the molten slag is not efficiently utilized, moreover, there might be a secondary waste generated and not all the waste slag can be processed and utilized.

Therefore, it is desired to provide a method for effectively utilizing the huge amount of furnace slag.

SUMMARY OF THE INVENTION

An object of the present invention is to provide a method for manufacturing an inorganic nonmetal foam material by directly modifying a molten slag and adding a foaming agent.

Another object of the present invention is to provide a method for manufacturing an inorganic nonmetal foam material product by directly modifying a molten slag and under the action of a foaming agent.

An embodiment of the present invention provides a method for manufacturing a foam material by using a molten slag including: introducing the molten slag into a pool for preserving heat and modifying, wherein a temperature of the molten slag is maintained at 1400° C.-1500° C., and adding a viscosity modifier and/or a color modifier to the molten slag to adjust a viscosity and/or a color of the molten slag according to requirements of a product to be manufactured; introducing the molten slag discharged from the pool for preserving heat and modifying into a foaming pool while adding a foaming agent to the molten slag, wherein the molten slag in the foaming pool is controlled at 1250° C.-1400° C. so as to foam and mold; and maintaining the foamed and molded slag at 800° C.-1000° C. for 20-30 minutes in a non-reducing atmosphere, and then naturally cooling the foamed and molded slag to a room temperature so as to obtain the foam material, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO.

In an embodiment of the present invention, the molten slag includes 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

In an embodiment of the present invention, the viscosity modifier may be at least one of clay, porcelain clay, lodestone, pottery clay, feldspar, quartz sand and $TiO_2$, and the viscosity modifier is added in an amount of 3-10 wt % based on a weight of the molten slag. The color modifier may be at least one of oxides of Ti, Cr, Ni, Cu, Co and Fe, ore powders containing the oxides and industry wastes containing the oxides, and the color modifier is added in an amount of 0-5 wt % based on a weight of the molten slag. The foaming agent may be carbonate, and is added in an amount of 3-5 wt % based on a weight of the molten slag. The carbonate may include at least one of calcium carbonate, magnesium carbonate, calcium magnesium carbonate, other minerals containing carbonates and a mixture thereof. More particularly, the carbonate may include limestone, dolomite and magnesite.

In an embodiment of the present invention, the step of foaming and molding may include foaming the molten slag first and then molding the foamed molten slag in a mold, or directly foaming and molding the molten slag in a mold.

In an embodiment of the present invention, the molten slag is a molten slag directly discharged from a metallurgy reactor or a remolten slag.

DETAILED DESCRIPTION OF THE PREFERRED EMBODIMENTS

Embodiments according to the present invention will be described in detail hereinafter.

A molten blast furnace slag is a waste produced in iron making using a blast furnace, which includes 10-40 wt % of $Al_2O_3$, 5-25 wt % of MgO, 10-50 wt % of $SiO_2$, and 10-40 wt % of CaO as well as a small amount of FeO, C, MnO, S and the like, and the temperature of which is in the range of 1350° C.-1480° C. Preferably, the molten blast furnace slag includes 10-20 wt % of $Al_2O_3$, 5-10 wt % of MgO, 20-35 wt % of $SiO_2$, and 20-30 wt % of CaO as well as a small amount of FeO, C, MnO, S and the like.

An embodiment of the present invention provides a method for manufacturing a foam material by using a molten slag, and the molten slag may include 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO. Preferably, the molten slag may include 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO. The molten slag may be a molten slag directly discharged from a metallurgy reactor or a remolten slag. According to the method of the present invention, the molten slag discharged from the blast furnace may be directly utilized, thereby not only saving the power consumption for melting a raw material, but also avoiding the consumption of water for cooling down the blast furnace slag by water quench and the generation of a secondary waste.

In the method of the present invention, the temperature of the molten slag in a pool for preserving heat and modifying is controlled to be in the range of 1400° C.-1500° C. Whether a modification is made to the molten slag or not may be determined according to the apparent density (or porosity) and color of the foam material to be manufactured, wherein the modification includes an adjustment of viscosity and/or color.

More particularly, a viscosity modifier may be at least one of clay, porcelain clay, lodestone, pottery clay, feldspar and quartz sand. The viscosity modifier is added in an amount of 3-10 wt % based on a weight of the molten slag. A color modifier may be at least one of oxides of Ti, Cr, Ni, Cu, Co and Fe, such as $TiO_2$, $Cr_2O_3$, NiO, CuO, $Cu_2O$, CoO, FeO, $Fe_2O_3$ and the like, ore powders containing these oxides and industry wastes containing these oxides, such as waste slag (red mud) generated by $Al_2O_3$ manufacture. The color modifier is added in an amount of 0-5 wt % based on a weight of the molten slag.

Then the molten slag is transferred from the pool for modifying to a foaming pool while adding a foaming agent to the slag, wherein the temperature of the slag in the foaming pool is controlled in the range of 1250° C.-1400° C. for foam molding.

In particular, the foaming agent may be carbonate, and the foaming agent is added in an amount of 3-5 wt % based on a weight of the molten slag. More particularly, the carbonate may include at least one of calcium carbonate, magnesium carbonate, calcium magnesium carbonate, other minerals containing carbonates and a mixture thereof, for example, calcium carbonate, magnesium carbonate, limestone, dolomite, magnesite and the like. During the process of foam molding, the molten slag may be foamed and then is molded in a mold. Alternatively, the molten slag may be directly foamed and molded in a mold.

Next, the foam molded slag is maintained at a temperature of 800° C.-1000° C. for 20-30 minutes in a non-reducing atmosphere, and then is naturally cooled to a room temperature so as to obtain a desired foam material.

In the method according to the present invention, according to the size and shape of the mold used during in the molding, foam products having a desired shape are directly manufactured using the molten slag by the method.

Hereinafter, examples of the present invention will be described in detail.

Example 1

Lodestone was added to a molten slag having a temperature of 1500° C. in an amount of 10 wt % based on a weight of the molten slag to adjust the viscosity of the molten slag. In this example, no color modifier was added. Next, the slag was foamed at a temperature of 1400° C. by using calcium carbonate as a foaming agent in an amount of 5 wt % based on the weight of the molten slag. The foamed product was maintained at a temperature of 1000° C. for 20 minutes, and then was naturally cooled to a room temperature. As a result, a foam material having a density of 0.40 g/cm³ was obtained as needed.

Example 2

Clay was added to a molten slag having a temperature of 1400° C. in an amount of 5 wt % based on a weight of the molten slag to adjust the viscosity of the molten slag. Iron oxide red as a color modifier was added to the molten slag in an amount of 5 wt % based on the weight of the molten slag. Next, the slag was foamed at a temperature of 1300° C. by using magnesium carbonate as a foaming agent in an amount of 5 wt % based on the weight of the molten slag. The foamed product was maintained at a temperature of 800° C. for 30 minutes, and then was naturally cooled to a room temperature. As a result, a foam material having a density of 0.41 g/cm³ was obtained as needed.

Example 3

$TiO_2$ was added to a molten slag having a temperature of 1450° C. in an amount of 3 wt % based on a weight of the molten slag to adjust the viscosity of the molten slag. $Cr_2O_3$ as a color modifier was added to the molten slag in an amount of 3 wt % based on the weight of the molten slag. Next, the slag was foamed at a temperature of 1250° C. by using dolomite as a foaming agent in an amount of 3 wt % based on the weight of the molten slag. The foamed product was maintained at a temperature of 950° C. for 25 minutes, and then was naturally cooled to a room temperature. As a result, a foam material having a density of 0.45 g/cm³ was obtained as needed.

Example 4

$TiO_2$ and quartz sand were added to a molten slag having a temperature of 1500° C. in amounts of 3 wt % and 3 wt % based on a weight of the molten slag, respectively (totally 6 wt %), to adjust the viscosity of the molten slag. $Cr_2O_3$ as a color modifier was added to the molten slag in an amount of 0.5 wt % based on the weight of the molten slag. Next, the slag was foamed at a temperature of 1250° C. by using dolomite as a foaming agent in an amount of 4 wt % based on the weight of the molten slag. The foamed product was maintained at a temperature of 950° C. for 25 minutes, and then was naturally cooled to a room temperature. As a result, a foam material having a density of 0.43 g/cm³ was obtained as needed.

The method for manufacturing foam materials by using the molten slag according to the embodiments of the present invention has the following advantages:

1) An energy-saving and efficient method for comprehensively utilizing the blast furnace slag is provided;

2) The molten slag discharged from the blast furnace is directly utilized, thereby not only saving the power consumption for melting a raw material, but also avoiding the consumption of water for cooling the blast furnace slag by water quench and the generation of the secondary waste; and 3) The produced inorganic nonmetal foam material and products thereof have such characteristics as stable color quality, abrasion resistance, pressure resistance, small thermal conductivity, and excellent sound absorption, adsorption and filtering performances, which may have main performance indexes as follows:

| Average pore diameter (mm) | Apparent density (g/cm³) | Thermal conductivity (W/(m.k)) | Compressive strength (MPa) | Water absorption (%) |
|---|---|---|---|---|
| 1.5-3.5 | 0.40-0.45 | 0.12-0.15 | 4.5-5.5 | 3.0-4.0 |

The present invention is not limited to the above embodiments, and various modification and changes may be made without departing from the scope of the present invention.

What is claimed is:

1. A method for manufacturing a foam material by using a molten slag, comprising:
   introducing the molten slag into a pool for preserving heat and modifying, wherein a temperature of the molten slag is maintained at 1400° C.-1500° C., and adding a viscosity modifier and/or a color modifier to the molten slag to adjust a viscosity and/or a color of the molten slag according to requirements of a product to be manufactured;

introducing the molten slag discharged from the pool for preserving heat and modifying into a foaming pool while adding a foaming agent to the molten slag, wherein the molten slag in the foaming pool is controlled at 1250° C.-1400° C. so as to foam and mold; and maintaining the foamed and molded slag at 800° C.-1000° C. for 20-30 minutes in a non-reducing atmosphere, and then naturally cooling the foamed and molded slag to a room temperature so as to obtain the foam material, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO.

2. The method according to claim 1, wherein the molten slag includes 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

3. The method according to claim 1, wherein the viscosity modifier is at least one of clay, porcelain clay, lodestone, pottery clay, feldspar, quartz sand and $TiO_2$, and the viscosity modifier is added in an amount of 3-10 wt % based on a weight of the molten slag.

4. The method according to claim 1, wherein the color modifier is at least one of oxides of Ti, Cr, Ni, Cu, Co and Fe, ore powders containing the oxides and industry wastes containing the oxides, and the color modifier is added in an amount of 0-5 wt % based on a weight of the molten slag.

5. The method according to claim 1, wherein the foaming agent is carbonate and is added in an amount of 3-5 wt % based on a weight of the molten slag.

6. The method according to claim 5, wherein the carbonate includes at least one of calcium carbonate, magnesium carbonate, calcium magnesium carbonate, other minerals containing carbonates and a mixture thereof.

7. The method according to claim 1, wherein the step of foaming and molding includes foaming the molten slag first and then molding the foamed molten slag in a mold, or directly foaming and molding the molten slag in a mold.

8. The method according to claim 1, wherein the molten slag is a molten slag directly discharged from a metallurgy reactor or a remolten slag.

9. The method according to claim 2, wherein the viscosity modifier is at least one of clay, porcelain clay, lodestone, pottery clay, feldspar, quartz sand and $TiO_2$, and the viscosity modifier is added in an amount of 3-10 wt % based on a weight of the molten slag.

10. The method according to claim 2, wherein the color modifier is at least one of oxides of Ti, Cr, Ni, Cu, Co and Fe, ore powders containing the oxides and industry wastes containing the oxides, and the color modifier is added in an amount of 0-5 wt % based on a weight of the molten slag.

11. The method according to claim 2, wherein the foaming agent is carbonate and is added in an amount of 3-5 wt % based on a weight of the molten slag.

12. The method according to claim 2, wherein the step of foaming and molding includes foaming the molten slag first and then molding the foamed molten slag in a mold, or directly foaming and molding the molten slag in a mold.

13. The method according to claim 2, wherein the molten slag is a molten slag directly discharged from a metallurgy reactor or a remolten slag.

* * * * *